United States Patent [19]
Woods et al.

[11] Patent Number: 5,446,964
[45] Date of Patent: Sep. 5, 1995

[54] APPARATUS AND METHOD FOR PACKAGING AND ASSEMBLING A FLEXIBLE LINE TRIMMER

[75] Inventors: Donald M. Woods; Rayford A. Cockerham; Jerry E. Stuart, all of Shreveport, La.

[73] Assignee: WCI Outdoor Products, Inc., Cleveland, Ohio

[21] Appl. No.: 96,483

[22] Filed: Jul. 22, 1993

[51] Int. Cl.6 .............................. A01D 50/00
[52] U.S. Cl. ...................... 30/276; 30/277.4
[58] Field of Search ............. 30/276, 277.4, 275; 56/12.7, DIG. 18, 239

[56] References Cited

U.S. PATENT DOCUMENTS

| | | |
|---|---|---|
| D. 161,109 | 12/1950 | Keiper . |
| D. 251,699 | 5/1979 | Averitt . |
| D. 301,009 | 5/1989 | Pilatowicz et al. . |
| D. 308,003 | 5/1990 | Kraynyk . |
| 942,490 | 12/1909 | Dunn . |
| 2,641,012 | 6/1953 | Storrs . |
| 2,756,555 | 7/1956 | Lewis . |
| 3,330,102 | 7/1967 | Shuman . |
| 3,561,199 | 2/1971 | Lay . |
| 3,803,819 | 4/1974 | Ehrlich . |
| 3,831,278 | 8/1974 | Voglesonger . |
| 3,861,127 | 1/1975 | Ritums et al. . |
| 4,007,526 | 2/1977 | Langenstein . |
| 4,043,101 | 8/1977 | Lahr et al. . |
| 4,052,789 | 10/1977 | Ballas . |
| 4,156,312 | 5/1979 | Ballas . |
| 4,156,967 | 6/1979 | Ballas . |
| 4,238,866 | 12/1980 | Taylor . |
| 4,338,719 | 7/1982 | Burkholder . |
| 4,463,498 | 8/1984 | Everts . |
| 4,550,499 | 11/1985 | Ruzicka . |
| 4,578,863 | 4/1986 | Lavorick . |
| 4,603,478 | 8/1986 | Anderson . |
| 4,641,431 | 2/1987 | Leming et al. . |
| 4,654,971 | 8/1987 | Fetters et al. . |
| 4,760,646 | 8/1988 | Siegler ................... 30/275.4 |
| 4,829,675 | 5/1989 | Beihoffer . |
| 4,860,451 | 8/1989 | Pilatowicz et al. . |
| 4,894,914 | 1/1990 | Mead . |
| 4,916,818 | 4/1990 | Panek . |
| 4,924,573 | 5/1990 | Huddleston . |
| 4,944,711 | 7/1990 | Hironaka et al. . |
| 4,976,031 | 12/1990 | Miller . |

*Primary Examiner*—Kenneth E. Peterson
*Attorney, Agent, or Firm*—Marc A. Hubbard

[57] ABSTRACT

A flexible line trimmer for shipping and storing in a knocked down version for reduced package sizes includes a single length of tube that is received within an extended neck portion of a motor housing. During final assembly, the tube is extended and locked into position without the need for tools.

18 Claims, 7 Drawing Sheets

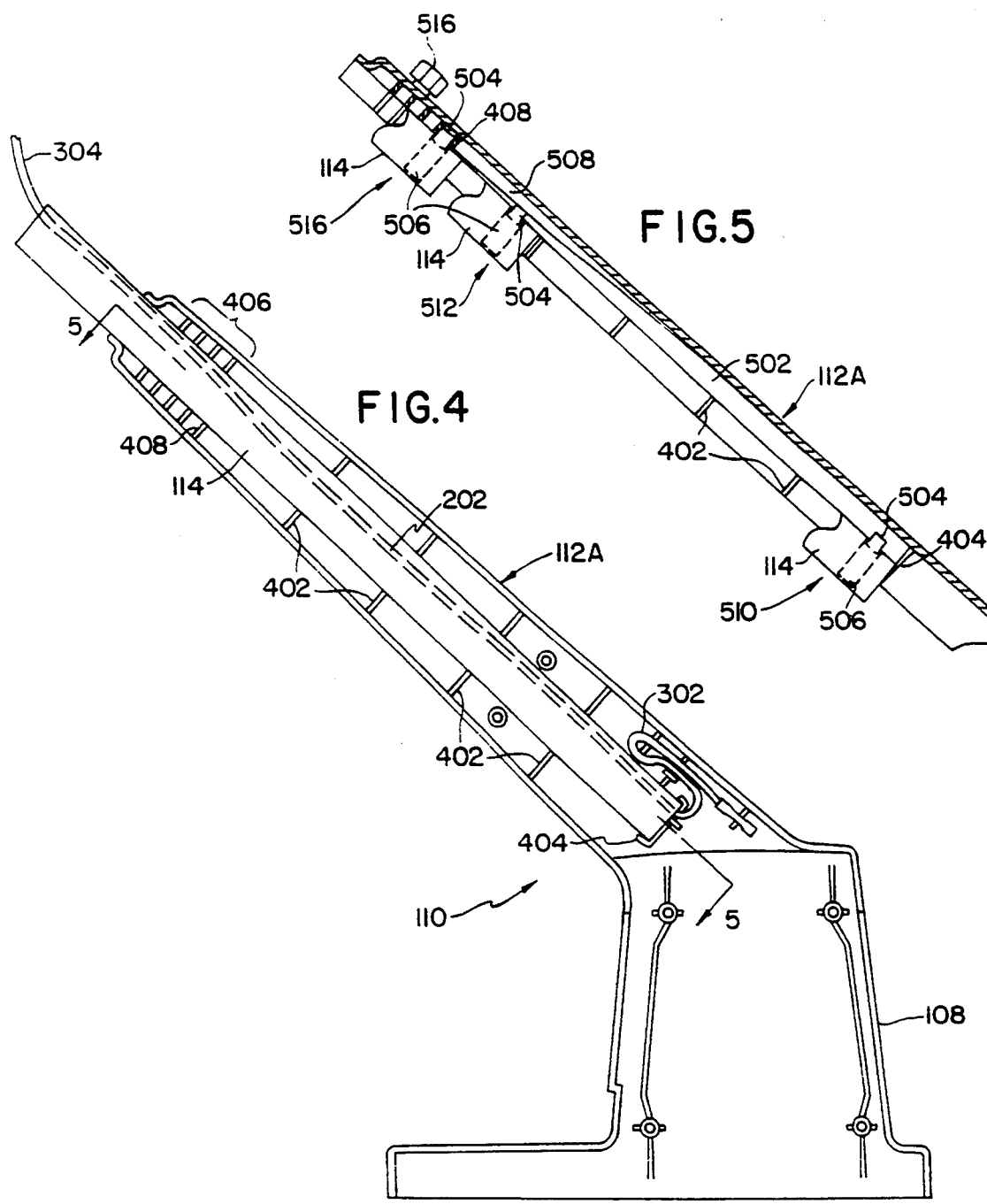

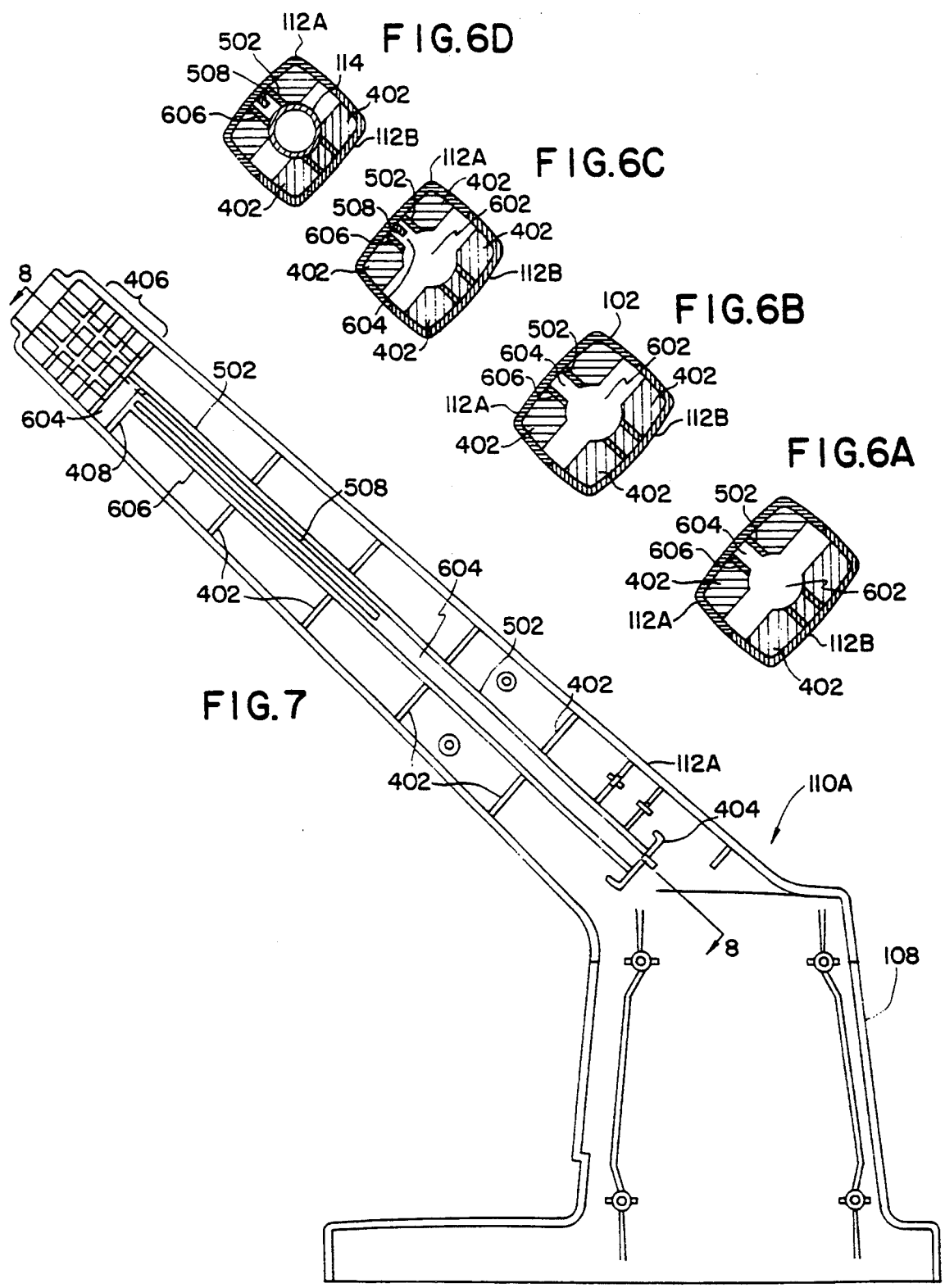

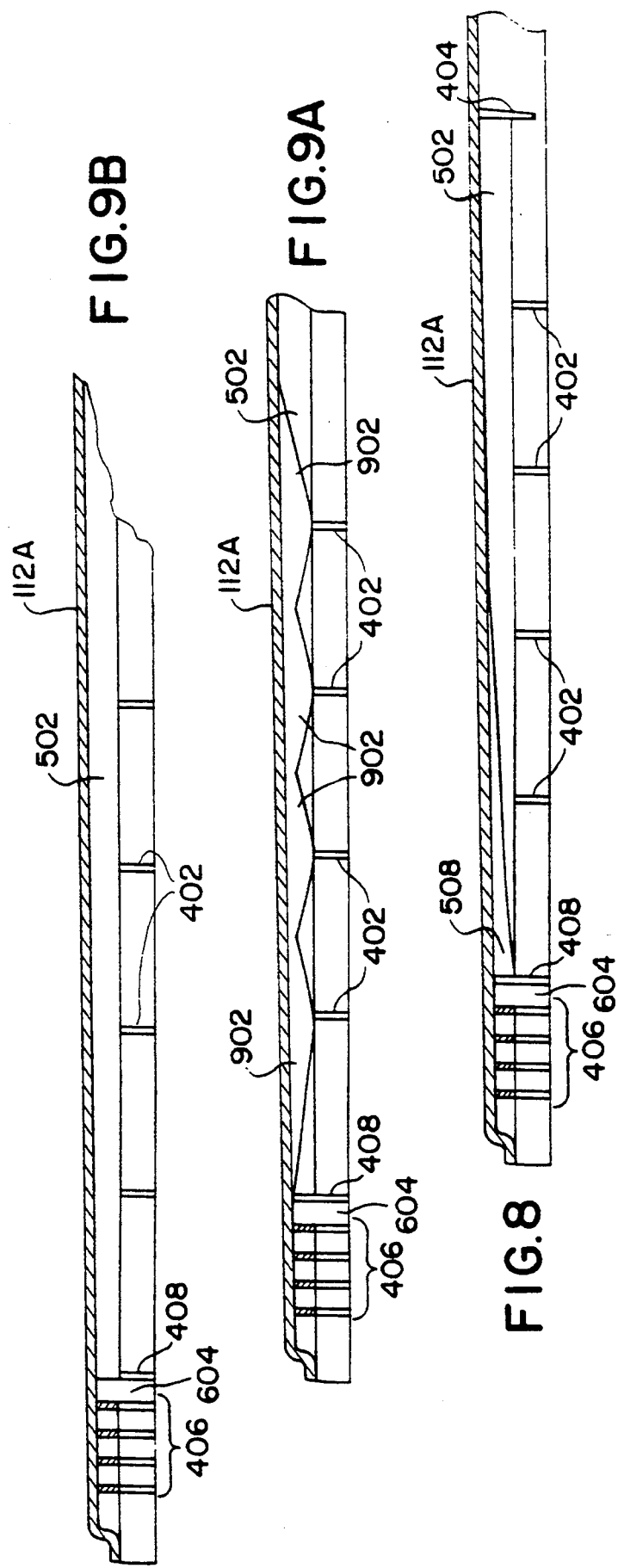

APPARATUS AND METHOD FOR PACKAGING AND ASSEMBLING A FLEXIBLE LINE TRIMMER

FIELD OF INVENTION

The invention relates to assembling flexible line trimmers shipped in a disassembled state.

BACKGROUND OF THE INVENTION

An electrically powered trimmer includes a cutting dement mounted to the drive shaft of an electric motor, a housing in which the motor is mounted and that is attached to one end of a tube, and a pair of handles at the opposite end of the tube. The cutting dement is most often a length of flexible line, though it could also be a blade. The length of line extends from a line head connected to the shaft of the motor. The head is spun rapidly to flail the line against vegetation. Because the line frequently breaks, a supply of flexible line is stored on a spool in the head, the end of the line extending through an opening in the head.

An operator holds the trimmer while standing erect by grasping with one hand a main handle attached to the end the tube that extends upwardly and rearwardly from the housing. Depending on the size of the trimmer, the other hand may grasp an auxiliary handle that can be attached lower down on the tube between the main handle and the housing to provide enhanced control. A trigger located, usually, on the main handle operates a normally off switch that turns the motor on and off.

Usually, power is delivered to the motor by a 120 volt alternating current from a household outlet. A plug or "pigtail" for connection to an extension cord running from the outlet is typically located in the rear of the handle, but is sometimes located elsewhere on the trimmer. The power source alternately is a battery pack placed in the vicinity of the main handle for balance. With either power source, a power wire runs to the electric motor in the housing through the tube to the normally-off trigger switch on the rear handle.

To save space, electric, flexible line trimmers are sometimes packaged and shipped in a "knocked down" or partially disassembled state. The benefits of packing trimmers disassembled are well known and it has been done for many years. Traditionally, to knock down the trimmer, the tube that supports the handles is manufactured in two or more sections that are separated and folded over when placed in a box. In other cases, the tube may be manufactured as a single piece but not attached to the motor housing, the main handle or both to save space.

For safety, the trimmer must be "prewired," as the wire through the tube carries relatively high voltage (120 volt) alternating current. The wire is run through the tube and attached to the electric motor and the power plug and/or trigger switch on the main handle before packaging and shipment. The lower length of the tube is then attached to the housing and the upper length is attached to the rear handle. When the trimmer is taken from the box, the two pieces of the tube are pushed together and secured with bolts. One end of the tube length has a smaller diameter so that it slides into the larger diameter end of the other tube length. An electric trimmer of the general type described is disclosed in U.S. Pat. No. 4,829,675, issued May 16, 1989 to Beihoffer.

Although of considerable benefit in terms of cost of shipping and storage to those who sell trimmers, consumers find assembling a knocked down line trimmer a nuisance and inconvenience. Furthermore, final assembly is not as simple as it may appear. As pointed out in Beihoffer, an extra length of wire is necessary to allow the tube pieces to be pulled apart and folded over and to prevent the end of each piece rubbing against the wire during shipment. The extra length of wire is relatively stiff due to having a size sufficient to carry the AC current. It must be pushed into one or both tube halves, thus making assembly more difficult and tedious. Beihoffer points out that problems may result from a consumer assembling the handle portions in a rough manner or inappropriately forcing the extra wire into one or both handle halves. Furthermore, proper orientation of the upper length of tube length with the lower length is frequently overlooked by first time buyers and is not discovered until after bolts are installed to secure the tube lengths, thus causing frustration and discontent.

Retailers would, naturally, prefer to provide to customers the convenience of a fully assembled trimmer. To maintain the goodwill of their customers, some retailers are willing to assemble the trimmers when they are offered for sale or are sold. However, this may require extra trained personnel. Sometimes they do not have the personnel immediately available or must charge a fee to recover costs, thus inconveniencing the customer.

Beihoffer addresses the problem of the extra length of wire and teaches cutting notches in the ends of the tubes so that the length of the wire may be reduced. However, he provides only a partial solution. Assembly of the tube sections is still required and is inconvenient to the consumer. Thus, the demand for a solution remains.

SUMMARY OF THE INVENTION

Addressing these problems, the invention is an electric trimmer which can be pulled from a package in a knocked-down state and properly assembled in seconds without tools or the opportunity for missteps. Thus, consumers may conveniently assemble the line trimmer, without hassle and without the help of, or the expense to, retailers.

According to the invention, a prewired electric trimmer is packaged for shipment with a single elongated handle support inserted into and received by a specially adapted extended neck of a housing for an electric motor. When the trimmer is removed from the box for final assembly, the tubular handle support is pulled from the housing by a main handle located at the end of the handle support. Once the handle support is extended,, it is secured so that the trimmer has convenient height to operate while standing. The handle support and the housing cooperate to maintain proper orientation of the main handle with respect to the housing.

The invention thus eliminates the inconvenience and problems associated with assembling two pieces of the tubular handle support, as well as the possibility of improper orientation. Furthermore, the wire running from the main handle to the electric motor does not interfere with final assembly.

In accordance with another aspect of the invention, the neck of the housing includes a straight guide, parallel to the handle, and a cooperating member that maintains proper orientation of the tube. The cooperating member is preferably a spring biased detent button that clicks into place when the tube is extended to an operating position, the clicking providing feedback to the consumer that the tube is properly extended.

In accordance with several other aspects of the invention, the guide includes a ramp with an abrupt end that slowly depresses the detent button as the tube is extending and then drops the button at its end, locking the tube into place and giving the customer further assurance that the tube is properly extended and in place. Arrows or other visual indicators may also be placed on the tube to indicate to the customer when the tube has been properly extended and placed in an operating position. By placing a second guide generally perpendicular to the first guide at the locking position allows the tube to be rotated to allow the cutting element of the trimmer to be used as an edger. To prevent tangling of the wire during final assembly, an extra length of wire necessary to accommodate the extension of the tube is pinned in the lower housing to take up any slack.

These and other advantages of the invention will be described with reference to a preferred embodiment illustrated by the appended drawings.

BRIEF DESCRIPTION OF THE DRAWINGS

FIG. 4 is side view of one half of a motor and handle tube housing for the line trimmer of FIG. 1 with the handle tube in a collapsed shipping position.

FIG. 5 is a partial cross-section of the motor and handle support tube housing half of FIG. 4, taken along section line 5—5, with the handle tube shown partly in section at three locations: at a fully collapsed, shipping position; a midway position; and a fully-assembled position.

FIG. 6A is a cross section taken through the motor and handle support tube housing of the line trimmer of FIG. 1, taken along the section line 6A—6A in FIG. 1.

FIG. 6B is a cross section taken through the housing of the line trimmer of FIG. 1, taken along the section line 6B—6B in FIG. 1.

FIG. 6C is a cross section taken through the housing of the line trimmer of FIG. 1, taken along the section line 6C—6C in FIG. 1.

FIG. 6D is a cross section taken through the housing of the line trimmer of FIG. 1, taken along the section line 6D—6D in FIG. 1.

FIG. 7 is a simplified side elevational view of half of the motor and handle support tube housing of the line trimmer of FIG. 1.

FIG. 8 is a partial cross-section of the housing half of FIG. 7 taken along section line 8—8.

FIG. 9A is a partial cross-section of an alternate embodiment of the housing half of FIG. 7 taken along section line 8—8 in FIG. 7.

FIG. 9B is a partial cross-section of an alternate embodiment for the housing half of FIG. 7 taken along section line 8—8 in FIG. 7.

DETAILED DESCRIPTION OF THE PREFERRED EMBODIMENT

Figure 1:
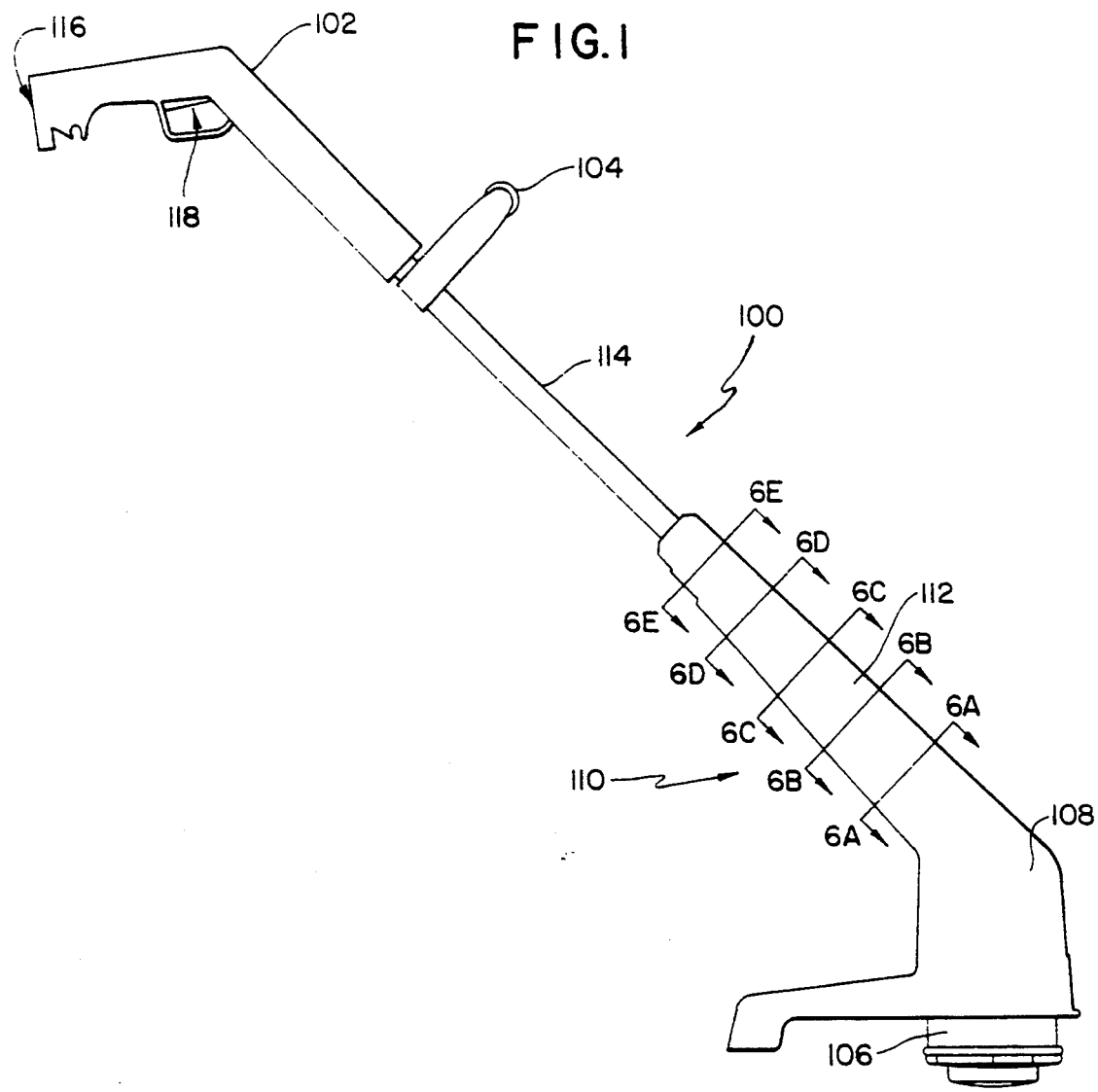
FIG. 1 is a side elevational view of a fully assembled line trimmer.

Illustrated in FIG. 1 is a fully-assembled flexible line trimmer 100 oriented in a trimming position. While standing, an operator grasps main handle 102 and auxiliary handle 104 to maneuver a rotating head 106 in close proximity to the ground. Head 106, having a conventional design, holds a spool of flexible cutting line for supplying a length of cutting line (not shown) that is flailed against ground vegetation by the rapidly spun head. The head is spun by an alternating current electric motor that is mounted within portion 108 of an integrally formed motor and handle tube housing 110. Neck 112 of the motor and handle tube housing extends upwardly and rearwardly, generally an angle to the ground plane and toward the operator. Connected to neck 112 is a lower end of a handle support tube 114. Main handle 102 is connected to an opposite, top end of the tube 114, in a conventional manner. The position of the main handle is fixed, but it may be telescoping or rotating if desired. Auxiliary handle 104 is clamped to the tube in a conventional manner.

Power is supplied to the line trimmer by connecting an extension cord from a 120 volt wall socket to a male plug (not seen) mounted within at a distal end 116 of main handle 102. The male plug is coupled through a normally closed switch, operated by trigger 118, to the motor by a wire (not shown) that runs through the tube 114 to the motor and handle tube housing 110. Pulling trigger 118 supplies current to the motor through the wire, causing the head 106 to rotate at high speeds. Alternatively, a battery can be incorporated with the main handle to supply power to a D.C. electric motor in the power housing.

Other types of cutting elements or work producing elements may be attached to the output shaft of the motor. Also, some trimmers may be operated or controlled effectively with only one hand, permitting the auxiliary handle to be dispensed with.

Figure 2:
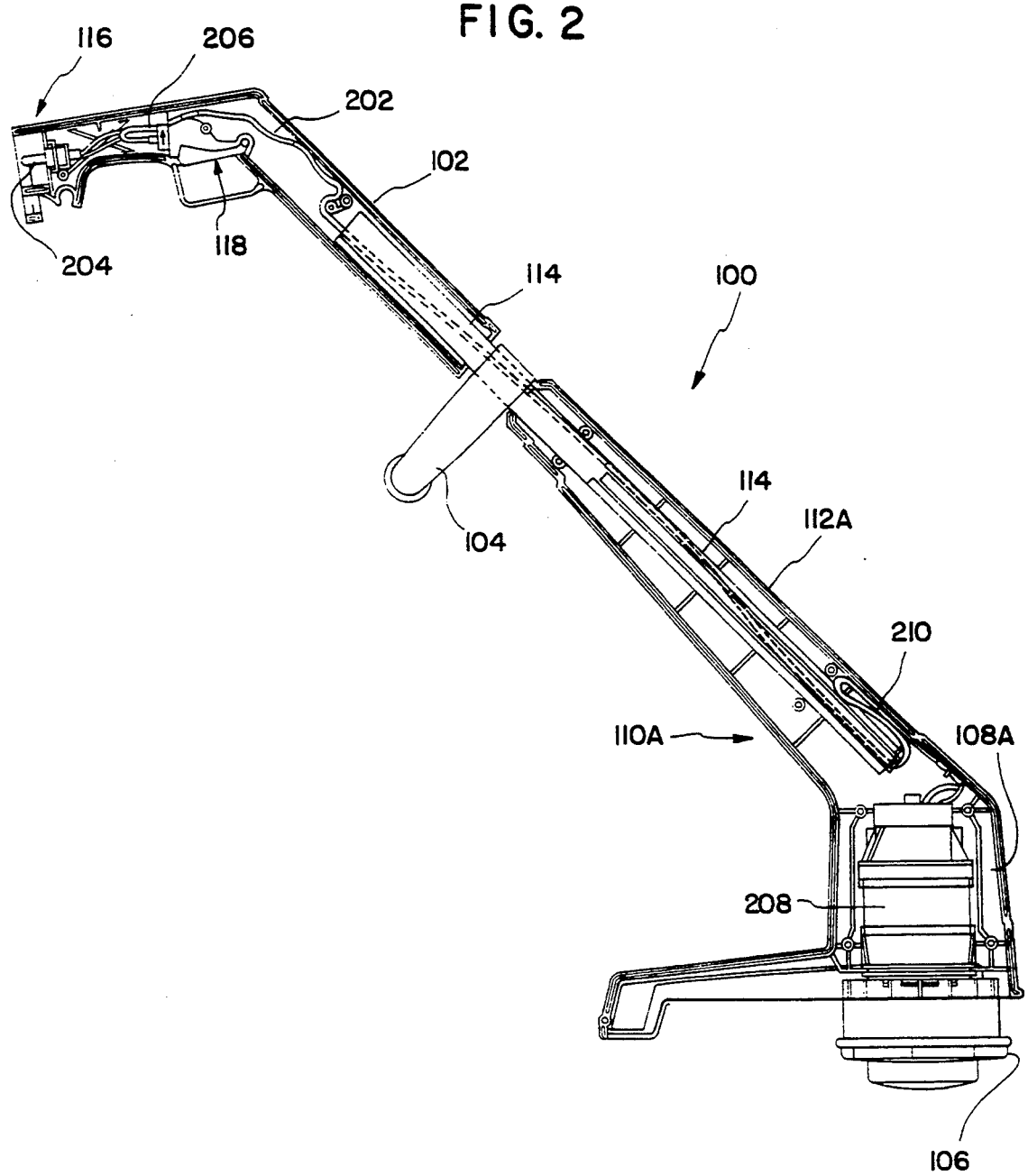
FIG. 2 is a side elevational view of the line trimmer of FIG. 1 in a collapsed shipping position and with a side of the handle and the motor and handle support tube housing removed.

Referring now to FIG. 2, when a line trimmer is packaged for shipping, it is placed in a knocked-down or collapsed condition, with the handle support tube 114 retracted within neck 112 of housing 110. In this fully retracted position, handle support tube 114 is received substantially within neck 112 of motor and handle support tube housing 110. Only enough of the tube remains for connecting handles 102 and 104. Please note that the drawing shows only side pieces 102A and 110A of, respectively, the main handle and the housing. Complementary side pieces are joined to make the handle 102 and housing 110.

During manufacture, wire 202 is run through tube 114 and connected at one end to plug 204 and switch 206 and to motor 208 at the other end. The wire is also pinned to the handle 102 and to neck 112 of housing 110 by wrapping it around several closely spaced tabs or bosses that pinch the cord when pulled. Pinning helps to prevent loosening the electrical connections with the plug and switch or with the motor. The handle is then attached to the end of the tube for shipment.

An extra length of wire 202 is pinned within housing 112, along the side of the end of the tube 114 when it is fully retracted to take up slack on the extra length of wire that is required to accommodate full extension of the tube. Pinning the extra length of wire in this manner helps to prevent interference from the wire kinking or jamming between the tube and housing when being withdrawn and to ensure placement of the tube and wire in the proper locations during assembly to avoid crimping and other problems that may occur during assembly and shipment. The pinning also accommodates retracting the tube subsequently, if desired.

Figure 3:
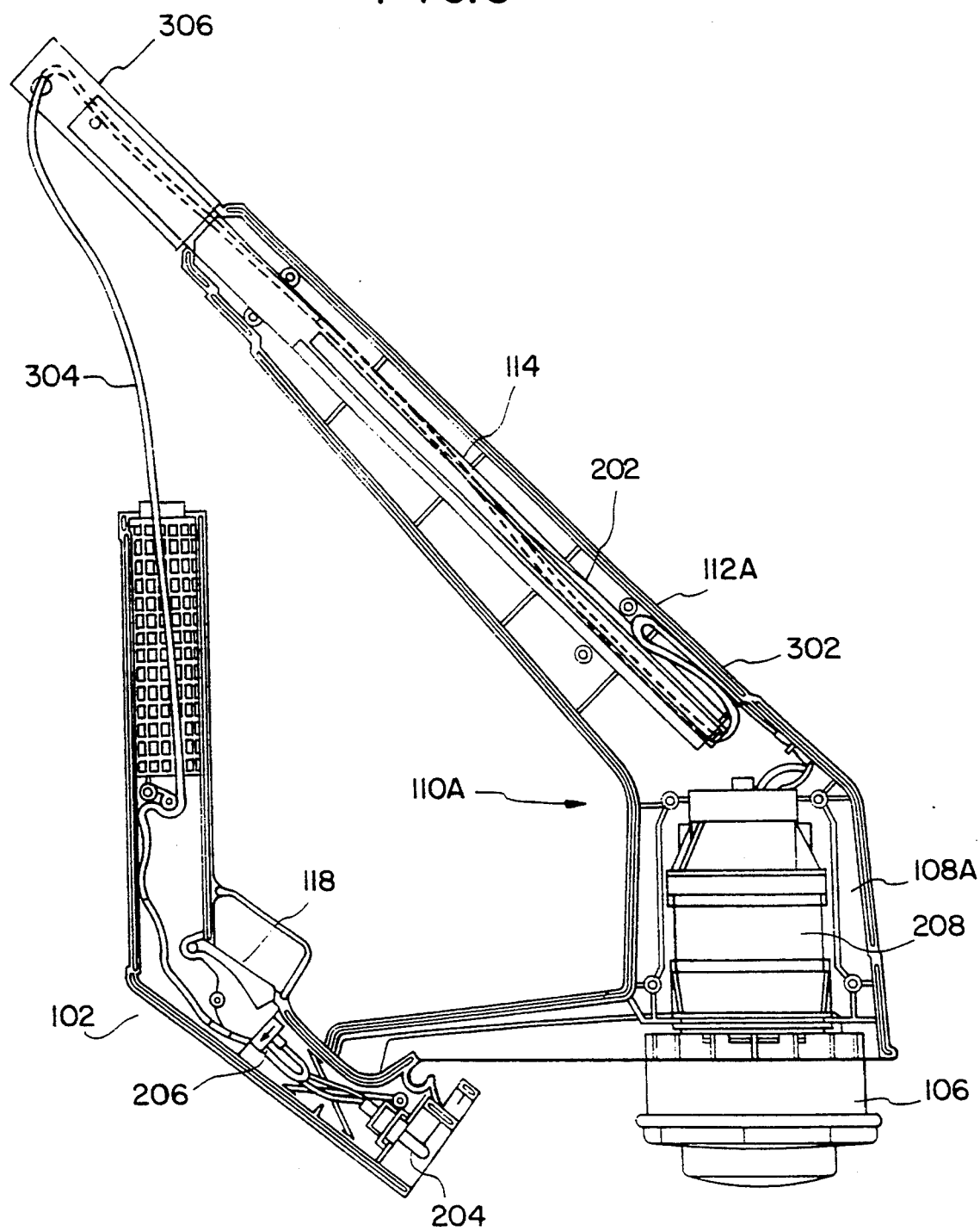
FIG. 3 is a side elevational view of the line trimmer of FIG. 1 in an alternate collapsed shipping position.

Referring now to FIG. 3, further reduction in height of the trimmer for smaller package volumes can be accomplished by not attaching handle 102 to the end of tube 114 during assembly. Wire loop 302 is much shorter than wire loop 210 in FIG. 2. Length of wire 304 at the other end of the tube, near the handle, accommodates the extension of the tube and also accommodates fitting the handle over the end of the tube for fired assembly. Shipping insert 306 prevents the end of tube 114 from chafing wire 202 during shipping. Note that the end of tube 114 is specially adapted to the handle so that the handle fits over and locks on the tube in a fixed, predetermined orientation with the tube.

Referring now to FIG. 4, the drawing is a simplified illustration of housing half 110. No motor or head is shown. Tube 114 is held in position within neck 112 of the housing by a series of spaced-apart reenforcing ribs 402 that are curved to receive the circular tube.. The housing also includes an end stop 404 for tube 114. When tube 114 is in a fully extended position and the trimmer is being held in the operative position, ribs 406 at the end of neck 112 of the housing 110 are more closely spaced to support housing 110 on tube 114 and to distribute stress.

Referring now to FIG. 5, along the length of the side of housing 112 is a straight trough or track formed by wall 502 and a wall that runs parallel to wall 502 and which cannot be seen in this cross-section. The trough functions as a guide for a detent button 504 that extends through a hole through the wall of the tube near its end, within housing 110. Detent button 504 is biased to an extended position with spring 506. After the trimmer is unpackaged, a person pulls on the main handle 102 (FIG. 1) on the end of the tube extending from the housing 110. Detent button tides up the trough and maintains a fixed and proper orientation of the tube with respect to the housing. Ramp 508 is formed in the middle of the trough so that the detent button is slowly depressed as the tube is extended. The drawing illustrates position 510 of the detent button when the tube is fully retracted; as it is being extended, which is position 512; and at position 514 where it is fully extended.

The abrupt end of the ramp prevents the detent button from tiding down the trough once extended, thus locking the tube 114 in a fully extended position. The clicking motion and sound the detent button makes when failing at the end of the ramp also provides important reassurance to a customer that the tube is fully extended and secured. Having the trimmer locked into a full extended position removes all decisions from the consumer. Knob 516 turns on a screw extending through both halves of housing 110 to tighten the neck of the housing about the tube. The trimmer is then finally assembled. Although no release is shown, it is possible to install a release mechanism to depress the detent button so that the tube may be collapsed for storage, transport or adjustability. Or, alternately, the abrupt end may be replaced with a relatively steep ramp that provides the clicking action upon extension but will depress the detent button when sufficient force is applied to the tube to collapse it.

In the fully extended position, the detent button rests in a second, semi-circular guide formed at the end of the ramp by wall 408 (which is also shown in FIG. 4) and the next adjacent of the plurality of ribs 406. This semicircular guide allows the tube 114 to be rotated one hundred eighty degrees so that the axis of rotation of the head 106 (FIG. 1) is parallel to the ground, allowing the trimmer to be used to cut an edge.

FIGS. 6A–6D are cross-sections taken through neck 112 of housing 110, as indicated on FIG. 1, at each of the ribs 402. Handle support tube 114 rests within the circular area 602 between the curved edges of ribs 402. Guide 604, in which the detent button 504 (FIG. 5) runs, is formed between walls 502 and 606. Ramp 508 is located in the center of the guide.

Figure 6E:
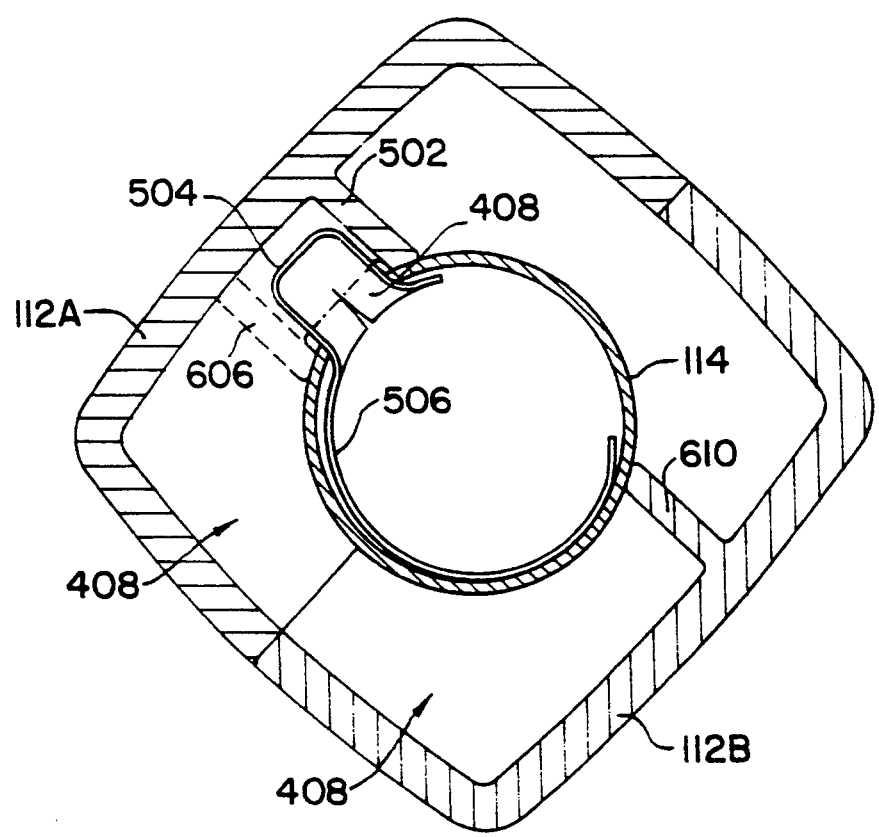
FIG. 6E is a cross section taken through the motor and handle tube housing of the line trimmer of FIG. 1, taken along the section line 6E—6E in FIG. 1.

Referring now to FIG. 6E, a cross-section is taken through the second, semi-circular guide 608 formed between wall 408 and the next adjacent rib 406, which is shown in FIGS. 4 and 5. Tube 114 may be rotated one hundred eighty degrees by loosening the damping of the end of neck 112 around the tube, its rotation being limited by the detent button 504 hitting walls 502 and 610.

Referring now to FIGS. 7 and 8, housing half 112A is shown by itself, without tube 114 obstructing a view of trough 604, ramp 508 within the trough, and second guide 604.

FIGS. 9A and 9B, which are cross sections of housing half 110A taken along section line 8—8 in FIG. 7, illustrate alternate profiles for ramp 508. In FIG. 9A, the ramp is replaced with a series of knolls 902 that have slopes in each direction over which the detent button 504 (FIG. 5) rides when moving in either the retracting or extending directions along the trough 604 (FIG. 7). The handle support tube 114 (FIG. 5) is thus movable between the fully extended and fully retracted positions and thus may be collapsed once fully extended. Valleys between the knolls provide incremental or discrete positioning of the detent button 504 (FIG. 5) and feedback to the customer that proper extension of the tube has been accomplished. The height of handle 102 (FIG. 1) above the ground thus may be incrementally adjusted to the height of the user. The neck of the housing 110 is tightened around the tube 114 with knob 516 (FIG. 5) to retain the tube in the selected position. In FIG. 9B, the ramp is entirely removed to allow for a continuously, rather than incrementally, adjustable handle height. The tube 114 is held at the desired height by tightening the neck of the housing around the tube.

The foregoing embodiments are intended merely as examples of the invention. Modifications, alterations, substitutions omissions and enhancements to the illustrated embodiments may be made without departing from the spirit and the scope of the invention as set forth in the appended claims.

What is claimed is:

1. An electric trimmer adapted for shipping in a partially disassembled state to reduce package size and for easy final assembly by an untrained person without problems typically associated with a two piece handle support, the trimmer comprising:
   an electric motor coupled to a vegetation cutter that is adapted to be held near to the ground for cutting vegetation;
   an elongated handle support tube, the tube having a length and adapted at one end to receive a main handle;
   a main handle including a switch for controlling a supply of power to the electric motor through a wire extending from the main handle, through the tube and to the electric motor; the main handle positioned to permit an operator to hold the cutter near the ground while standing;

a housing in which the motor is mounted, the housing having a portion in which the motor is mounted and an elongated neck portion that is adapted to receive a substantial portion of the length the elongated tube in a collapsed position in order to reduce an overall height of the trimmer for placement in a smaller package for shipment and storage; the neck being further adapted for enabling the elongated tube to be withdrawn in a linear fashion by a person and placed in an extended operating position, the neck of the housing and the handle support tube cooperating in the extended Operating position to enable positioning of the cutter in an operating position as an operator stands; wherein an extra length of the wire is pinned within the neck of the housing to take up slack while accommodating extension of the tube without the wire becoming tangled.

2. An electric trimmer adapted for shipping in a partially disassembled state to reduce package size and for easy final assembly by an untrained person without problems typically associated with a two piece handle support, the trimmer comprising:

an electric motor coupled to a vegetation cutter that is adapted to be held near to the ground for cutting vegetation;

an elongated handle support tube, the tube having a length and adapted at one end to receive a main handle;

a main handle including a switch for controlling a supply of power to the electric motor through a wire extending from the main handle, through the tube and to the electric motor; the main handle positioned to permit an operator to hold the cutter near the ground while standing;

a housing in which the motor is mounted, the housing having a portion in which the motor is mounted and an elongated neck portion that is adapted to receive a substantial portion of the length the elongated tube in a collapsed position in order to reduce an overall height of the trimmer for placement in a smaller package for shipment and storage; the neck being further adapted for enabling the elongated tube to be withdrawn in a linear fashion by a person and placed in an extended operating position, the neck of the housing and the handle support tube cooperating in the extended operating position to enable positioning of the cutter in an operating position as an operator stands; and an elongated guide along an inside portion of the neck of the housing and an engaging member on the tube cooperating with the guide to assist in maintaining a predetermined orientation of the tube with respect to housing.

3. The trimmer of claim 2 wherein the engaging cooperating member includes a detent button and wherein the guide includes a ramp for depressing the detent button during extension of the tube from the neck of the housing and then releasing the button for discrete positioning of the tube and positive feedback to a customer extending the robe.

4. The trimmer of claim 3 wherein the ramp terminates abruptly when the tube extends to an operating position, the ramp having an end for forming wall that prevents the detent button from being depressed when the tube is moved toward the collapsed position, thus substantially preventing collapsing of the tube by pushing on the tube.

5. The trimmer of claim 3 further including a plurality of ramps for providing multiple positions of the tube for operation.

6. The trimmer of claim 2 further comprising a second guide formed along the inside wall of the neck of the housing in a direction generally perpendicular to the first guide, the second guide cooperating with the engaging member to allow limited rotation of the housing with respect to the tube for positioning a cutting plane of the vegetation cutter between orientations generally perpendicular to the ground and generally parallel to the ground when the trimmer is held in a normal operating position.

7. The trimmer of claim 2 wherein the neck of the housing includes a damp that is manually operable without tools to tighten the neck about the robe once fully extended into an operating position.

8. An electric line trimmer adapted for shipping in a partially disassembled state to reduce package size and for easy final assembly by an untrained person without problems typically associated with a two piece handle support, the trimmer comprising:

an electric motor coupled to a vegetation cutter that is adapted to be held near to the ground for cutting vegetation;

an elongated handle support tube, the tube having a length and adapted at one end to receive a main handle;

a main handle including a switch for controlling a supply of power to the electric motor through a wire extending from the main handle, through the tube and to the electric motor; the main handle positioned to permit an operator to hold the cutter near the ground while standing; and a housing in which the motor is mounted, the housing having a portion in which the motor is mounted and an elongated neck portion that is adapted to receive a substantial portion of the length the elongated tube in a collapsed position in order to reduce an overall height of the trimmer for placement in a smaller package for shipment and storage; the neck being further adapted for enabling the elongated tube to be withdrawn in a linear fashion by a person and placed in an extended operating position, the neck of the housing and the handle support tube cooperating in the extended operating position to enable positioning of the cutter in an operating position as an operator stands; the means for guiding withdrawal further including means for indicating to a person that the tube has been placed in a proper operating position and means for maintaining a predetermined rotational orientation of the tube with respect to the housing.

9. The trimmer of claim 8 wherein the means for guiding further includes means for discrete positioning of the tube and for providing positive feedback to a customer extending the tube.

10. The trimmer of claim 9 wherein the means for discrete positioning includes means for substantially preventing collapsing of the tube by pushing on the tube once the tube has assumed an operating position.

11. The trimmer of claim 8 wherein the means for guiding includes means allowing limited rotation of the housing with respect to the tube for positioning a cutting plane of the vegetation cutter between orientations generally perpendicular to the ground and generally parallel to the ground when the trimmer is held in a normal operating position.

12. A hand-held vegetation cutting apparatus comprising a lower housing in which is mounted a motor having a drive shaft for driving a vegetation cutter depending from the lower housing and an elongated handle support tube having a lower end connected with the lower housing and an upper end to which is mounted an upper handle; the lower housing integrally formed with an elongated neck portion extending upwardly from the housing at a fixed angle relative to an axis of the motor's drive shaft and adapted to receive substantially the entire length of the tube, except for its end portion, in a collapsed position without interfering with its axial movement through an opening in an end of the neck; the end of the neck including a support adapted for laterally and axially retaining the lower end portion of the tube against the end of the neck when the tube is withdrawn from the neck to an extended position at which a standing operator may position the cutting element adjacent the ground while grasping the upper handle.

13. The apparatus of claim 12 further including a detente cooperating with the lower end of the tube and the support to retain the tube axially in its extended position with respect to the support when the tube is in the extended position.

14. The apparatus of claim 13 wherein the detente includes a spring-loaded button adapted to extend and to engage both the lower end of the tube and the support when the tube is in the extended position.

15. The apparatus of claim 12 further including a guide within the neck that extends along the length of the tube to cooperate with a detente on the tube for maintaining a predetermined rotational orientation of the tube during extension of the tube.

16. The apparatus of claim 15 wherein the support is adapted to cooperate with the detente to axially retain the tube when the tube is in the extended position.

17. The apparatus of claim 12 further including a spring-loaded button biased to extend from the lower end of the tube and a ramp within the neck for depressing the button as the lower end of the tube is moved toward the support and then releasing the button for cooperative engagement with the support to axially retain the tube with respect to the support.

18. The apparatus of claim 12 further including a clamp for tightening the support against the tube.

* * * * *